Jan. 26, 1937.  R. M. PARSONS  2,068,695
REMOTE CONTROL SYSTEM FOR OIL CRACKING PLANTS
Filed Oct. 16, 1934  2 Sheets-Sheet 2
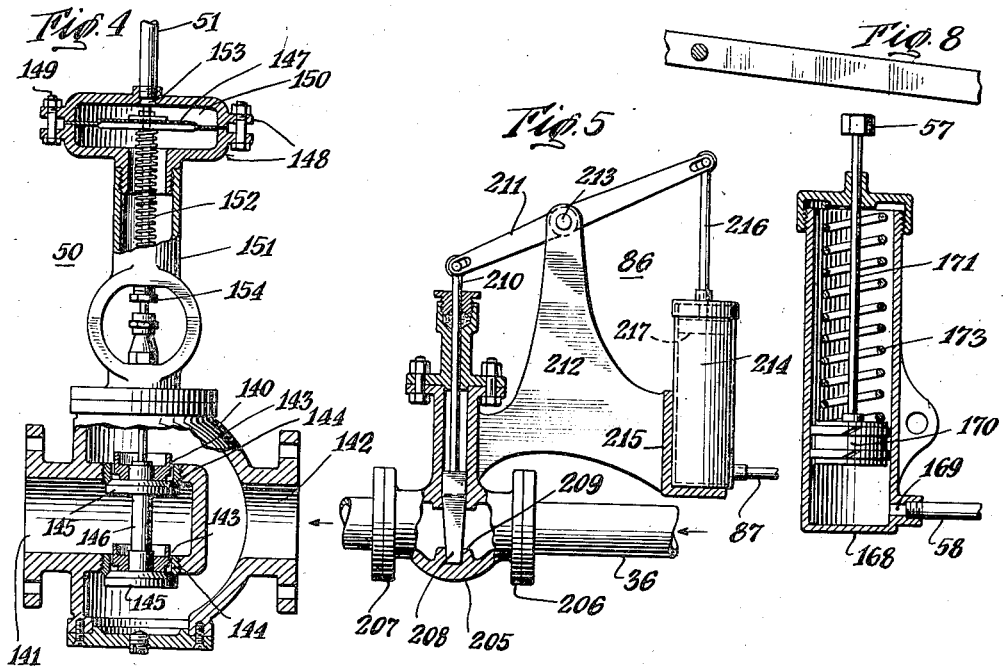
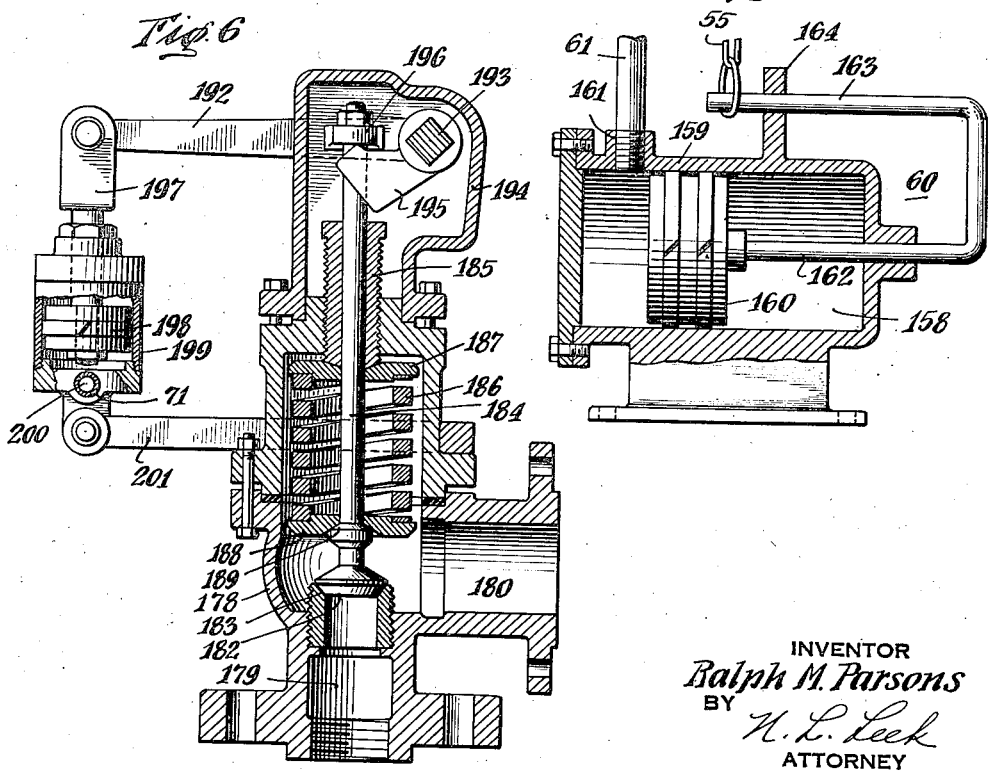
INVENTOR
Ralph M. Parsons
BY
N. L. Leek
ATTORNEY Patented Jan. 26, 1937

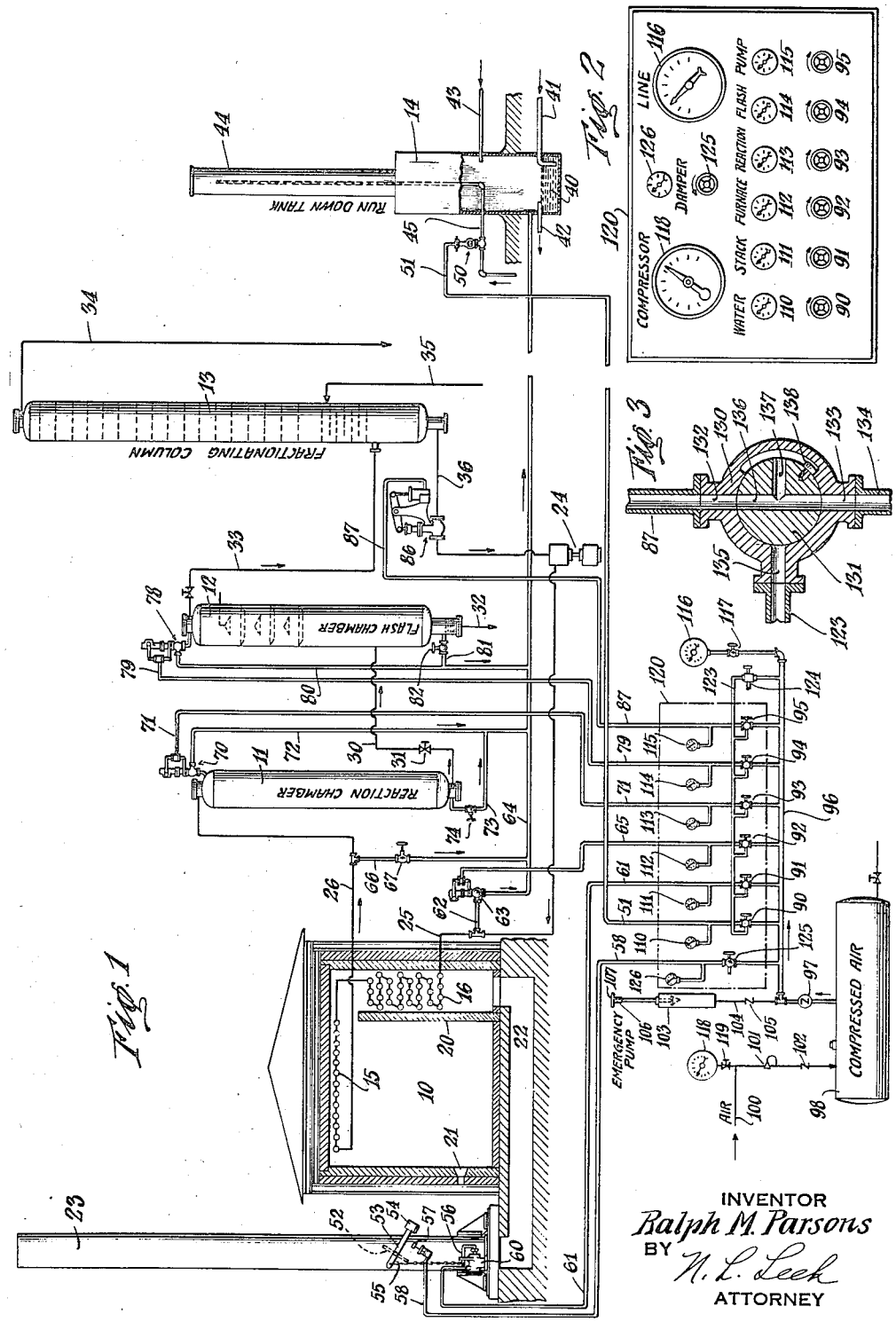

2,068,695

UNITED STATES PATENT OFFICE 2,068,695

REMOTE CONTROL SYSTEM FOR OIL CRACKING PLANTS

Ralph M. Parsons, Mount Vernon, Ohio, assignor to The Ralph M. Parsons Company, Mount Vernon, Ohio, a corporation of Delaware Application October 16, 1934, Serial No. 748,461

3 Claims. (Cl. 196—132)

This invention relates to oil refining and more particularly to a safety system with a remote control for shutting down the various parts of the plant in predetermined sequence or for dumping the plant in emergencies such as in case of fire.

In certain types of oil refineries, for example in cracking plants operating at high pressure, it is essential to use pressure relief valves to prevent rupture of the equipment due to excess pressures. These valves are arranged to discharge the inflammable fluid into a blow-down tank located at a safe distance. It may also be desired to empty the entire plant in case of failure of equipment, fire, or as a routine matter in shutting down the plant. In such cases, it is desirable to actuate certain controls in predetermined sequence.

The invention provides a pressure relief valve having means for manually operating the same from a remote point so that the valve, in addition to providing the safety means for automatically relieving excess pressure, may be manually opened to empty the apparatus when desired.

The invention also provides controls for the various valves which are arranged in proper sequence on an instrument panel so that the plant may be shut down by operating the controls in the order of their arrangement and a master control located at some safe locality for simultaneously operating all of the valves.

In accordance with the present invention the various valves are provided with a remote control operated by fluid pressure from a central point, as in the control room. The fluid pressure lines are actuated by a set of valves mounted on an instrument panel in the order of their preferred operation in shutting down the plant. The master control may be located at a different point so that it is accessible in event of fire in the control room. In order to guard against failure of the supply of fluid pressure, a storage tank is provided of sufficient capacity to operate all of the lines and as a further precaution a hand pump is connected to the fluid pressure lines to supply pressure thereto in case of failure of the storage tank.

The various units are discharged into a common line leading to a blow-down tank line into which the exhaust steam from the plant is constantly admitted. A water spray may be used to cool the vapors and oil below their ignition temperature.

The invention further provides valves specifically designed for operation in the above system so as to eliminate complicated or expensive valve construction and arrangement.

An object of the invention is to provide convenient, dependable and simple mechanism for accomplishing the above purposes.

Although the novel features which are believed to be characteristic of this invention will be more particularly pointed out in the claims appended hereto, the invention itself, as to its objects and advantages and the manner of its operation, may be better understood by referring to the embodiment thereof disclosed in the accompanying drawings and more specifically described herein, for purposes of illustration.

In the drawings:

Fig. 1 is a diagrammatic illustration of an oil cracking unit embodying the present invention;

Fig. 2 is an elevation of the control panel;

Fig. 3 is a detailed view of the fluid control valve;

Fig. 4 is a sectional view of the fluid controlled valve for admitting water to the blow-down tank;

Fig. 5 is a sectional view of the fluid controlled valve for closing the hot oil pump suction line;

Fig. 6 is a sectional view of a pressure relief valve with the air cylinder for remote control;

Fig. 7 is a sectional view of the stack damper release mechanism; and

Fig. 8 is a sectional view of the mechanism for adjusting the damper opening.

In the various figures like parts have been designated by like reference characters. Specific terms are used herein for convenience of description but it is to be understood that they are to be interpreted as broadly as the state of the art will permit.

Referring to the drawings more in detail, the invention is shown as applied to a conventional type of oil cracking plant having a furnace 10, a reaction chamber 11, a flash chamber 12, a fractionating column 13 and a blow-down tank 14.

The furnace 10 may be of conventional construction and may include a set of radiant heat tubes 15 and a bank of convection tubes 16 in which the oil is heated to the required temperature for cracking. The furnace may be provided with a bridge wall 20 and burners 21 which are adapted to direct the flame thereagainst. The combustion gases pass over the bridge wall and over the bank of convection tubes 16 into a duct 22 which leads to a stack 23 situated at a convenient point.

In normal operation oil for cracking is pumped by means of a hot oil pump 24, through an inlet pipe 25 to the bank of convection tubes 16, thence through the radiant heat tubes 15 wherein it is raised to cracking temperatures. The oil, still at high pressure and at cracking temperature, is then discharged from the furnace through the line 26 to the top of the reaction chamber 11 wherein it remains a sufficient length of time for the cracking reactions to be completed. From the bottom of the reaction chamber 11 the oil passes through a pipe 30 and a pressure reduction valve 31 into the flash chamber 12 wherein the low boiling constituents are separated from the heavy residuum which may be removed from the bottom of the flash chamber through the discharge pipe 32. The vapor which contains the lower boiling constituents is passed from the top of the flash chamber through a pipe 33 to the fractionating column 13 wherein the different boiling constituents are separated in the usual manner. The vapors containing the gasoline or other constituents which it is desired to utilize may be removed from the fractionating column through a pipe 34 and delivered to suitable storage or separating apparatus, not shown. The raw oil charge may be applied to the fractionating column 13 by means of an inlet pipe 35. The liquid which separates from the vapor and collects at the bottom of the fractionating column is withdrawn through a pipe 36 which leads to the suction side of the hot oil pump 24 above mentioned, by which it is recirculated for further cracking.

The above described apparatus is of a standard construction and only so much thereof has been set forth as is necessary to an understanding of the present invention. Obviously, the invention may be applied to any other type of fluid treating plant wherein remote control of a plurality of control elements is required. An oil cracking plant has been described for purposes of illustration only.

In the operation of equipment such as that above described at elevated temperatures or pressures, or both, it is usually desirable to install pressure relief valves which are adapted to open automatically at predetermined pressures so as to relieve the pressure in the apparatus and to prevent injury thereto. In the case of hazardous fluids such as petroleum, ammonia, etc., it also becomes necessary to provide the pressure relief valve with a vapor tight case and to connect the same with a pipe system for discharging the fluid to a safe locality. It is also necessary to be able to quickly empty the vessel or system in case of failure of some part of the equipment or process, or as a routine matter in shutting down the plant.

In shutting down the entire plant it is desirable to accomplish certain operations in a predetermined sequence, for example it may be desired to (1) supply a water spray to a blow-down tank which is to receive the discharged fluid, (2) to close the stack damper so as to retard the operation of the furnace, (3) to empty the furnace tubes, (4) to empty the reaction chamber, (5) to empty the flash chamber, and (6) to close the hot oil pump suction valve so as to prevent oil from flowing to the furnace. Obviously, it may also be desirable to effect any one of the above operations independently of the others or to carry out all of said operations simultaneously or to execute other operations dependent upon the type plant and mode of operation.

For the above purpose the invention provides a blow-down tank 14 in which a quantity of water 40 may be maintained by means of an inlet pipe 41 and a discharge pipe 42. Steam may be continuously admitted to the blow-down tank 14 through a steam pipe 43 which may receive exhaust steam from the plant. The steam escapes through a stack 44, except the portion thereof which condenses and is discharged through the water pipe 42.

An additional water pipe 45 is associated with the blow-down tank 14, extends upwardly in the stack 44, and is provided with perforations through which water may be discharged in the form of a spray so as to cool or condense the vapors discharged into the blow-down tank below their ignition point. The passage of water to the pipe 45 may be controlled by a valve 50, to be described, which is operated by fluid pressure supplied through the line 51.

The stack 23 may be provided with a damper 52 having a control arm 53 provided with a weight 54, which, when the control arm is released, is adapted to cause the damper to assume a closed or partly closed position determined by an adjustable stop 57. The damper 52 may be held in open position by means of a chain 55 which may be hooked over a pin 56 associated with a release mechanism 60, to be further described, which is adapted to be operated by fluid pressure supplied through a line 61. Application of fluid pressure to the release mechanism 60 causes sliding movement of the pin 56, whereby the pin is withdrawn from the chain 55, releases the chain and permits the damper 52 to be closed by the action of the weight 54. The stop 57, controlled by fluid pressure supplied through a line 58, provides for remote adjustment of the damper in closed position. The adjustment is preferably such that some smoke emerges from the stack 23, and only a little smoke emerges from the furnace itself. This ensures that any products of combustion which may be formed will pass up the stack instead of through the furnace walls.

For emptying the furnace tubes a line 62 is provided which is preferably connected to the intake pipe 25 at a low point so as to completely drain the furnace. The line 62 leads through a remote operated valve 63 to a discharge pipe 64 which latter discharges into the blow-down tank 14. The valve 63 is adapted to be operated by fluid pressure supplied through a line 65. A discharge pipe 66 having a hand-operated valve 67 may be connected from the furnace discharge pipe 26 to the discharge pipe 64 so that the pipe 26 may be emptied when desired.

The reaction chamber 11 may be provided with an automatic pressure relief valve 70 which is adapted for remote operation by means of fluid pressure received through line 71 and is connected by a pipe 72 to the discharge pipe 64. A drain pipe 73 controlled by a manual valve 74 may connect from the bottom of the reaction chamber to the pipe 72 for draining the chamber when desired.

The flash chamber 12 may be provided with an automatic pressure relief valve 78 adapted to be operated by remote control by fluid pressure received from line 79. The valve 78 may be connected by a pipe 80 to the discharge pipe 64. A drain pipe 81 controlled by a manual valve 82 may connect from the bottom of the flash chamber to the pipe 80 to permit the flash chamber to be drained when desired.

The passage of the hot oil from the bottom of the fractionating column 13 through the pipe 36 to the suction side of the hot oil pump 24 may be controlled by a valve 86 which is adapted to be operated by fluid pressure received through a line 87.

The lines 51, 61, 65, 71, 79 and 87 are connected through valves 90 to 95, respectively, to a header 96 which leads through a check valve 97 to a storage tank 98 for compressed fluid such as air. The tank 98 may be charged through a line 100 in which the fluid is maintained at a comparatively high pressure by suitable pump mechanism, not shown. The line 100 leads through a pressure reduction valve 101 and a check valve 102 to the tank 98. The tank 98 is of sufficient capacity to operate the entire safety system in event of failure of the fluid supply from the line 100. As an additional safety factor, a hand pump 103 is provided which applies the fluid directly to the header 96 through a pipe 104 and a check valve 105. The hand pump 103 may normally be locked as by threads 106 on the handle 107 to prevent escape of air through the check valve 105.

A set of gauges 110 to 115 may be connected to the lines 51, 61, 65, 71, 79 and 87, respectively, to indicate the fluid pressure therein. A suitable gauge 116 may be connected to the header 96 through a manual valve 117 and a gauge 118 may be connected to the line 100 through a manual valve 119. All of the valves 90 to 95 and gauges 110 to 116 and 118 may be arranged in a convenient location upon an instrument panel 120 to be further described.

Each of the valves 90 to 95 may have an exhaust port which is connected through a line 123 and a valve 124 to the header 96. The valve 124 may be located at a safe point, as outside the control room, and provides a master control simultaneously operating all of the control devices above described.

The line 58 may be connected through a valve 125 and a gauge 126, which may be mounted on the panel 120, to the header 96. The valve 125 provides an adjustment for the closed position of the damper 52 as above set forth.

Each of the valves 90 to 95, 104 and 125 may be of the same construction and may for example comprise a two-way valve illustrated in Fig. 3. This valve may comprise a housing 130 having a rotating valve 131 and provided with a port 132 adapted to be connected to the fluid supply line, for example the line 87, leading to the remote control mechanism. The valve may also have a port 133 adapted to be connected through a pipe 134 to the header 96. The valve also may include an exhaust port 135 which is adapted to be connected to the line 123 or, in the case of the valve 124, is left open to the atmosphere. The rotating valve member 131 is provided with a through passage 136 interconnecting the ports 132 and 133 when the valve is in the position shown and with a transverse passage 137 adapted to interconnect the ports 132 and 135 when the valve has been turned 90° in a counterclockwise direction from the position shown. In the latter position the port 133 is closed and the line 87 is vented through the port 135. A suitable stop member such as a pin 138 is provided to limit the movement of the valve member 131 so as to prevent the line 134 from being vented through the port 135.

The valve 50 for controlling the passage of water through the pipe 45 in the blow-down tank may be in the form illustrated in Fig. 4. This valve is shown as comprising a housing 140 having an inlet opening 141 and an outlet opening 142 which are in communication through a double port 143 comprising valve seats 144 and valves 145 cooperating therewith. Said valves 145 are carried upon a valve rod 146 which extends through a suitable bushing, not shown, in the housing 140 and engages a diaphragm carried between the halves of a split casing 148. The two halves of the split casing may be secured by bolts 149 to provide an air-tight chamber 150 above the diaphragm 147. The casing 148 may be supported by a suitable bracket 151 associated with the housing 140. A spring 152 is seated around the rod 146 between the diaphragm 147 and a shoulder, not shown, formed in the bracket 151, and tends normally to hold the valves 145 in upper position against their seats 144. Fluid pressure, for example compressed air, may be admitted to the chamber 150 through a port 153 to which the line 51 may be connected. Suitable adjustment of the valve rod 146 may be effected by means of adjusting nuts 154 which may be arranged in any well known manner for the above purpose.

In the operation of this valve the spring 152 normally holds the valve in closed position thereby shutting off the water supply to the blow-down tank 14. During this time the chamber 150 is vented through the valves 90 and 124 to the atmosphere. However, when fluid pressure is applied to the line 51, for example by turning the valve 90 into the position illustrated in Fig. 3, the fluid such as compressed air is supplied to the chamber 150, depresses the diaphragm 147 and causes the valve rod 146 and the valve 145 to move downwardly away from the valve seats 144, thereby opening the passage through the valve 50 and permitting water to be supplied through the pipe 45 to the blow-down tank 14.

A typical control device for the stack damper 52 is illustrated in Fig. 7. This device comprises a cylinder 158 having a housing 159 and containing a piston 160 adapted to be operated by pressure of a fluid admitted to the cylinder 158 through a port 161 connected to the line 61. The piston 160 is provided with a piston rod 162 which extends externally of the cylinder 158 and is joined to a parallel pin 163 extending through a bracket 164 formed on the housing 159 and adapted to engage a link in the chain 55.

In the operation of this device the pin 163 engages a link in chain 55 to hold the damper 52 in open position, the cylinder 158 being vented through valves 91 and 124 to the atmosphere. When fluid pressure is supplied to the cylinder 158 as by suitable manipulation of the valve 91 the piston 160 is moved in a direction to withdraw the pin 163 from the link in the chain 55 thereby releasing the chain and permitting the weight 54 to close the damper 52.

The mechanism for adjusting the stop 57 is illustrated in Fig. 8 which shows a cylinder 168 having an inlet port 169 adapted to be connected to the line 58 and having a piston 170 provided with a piston rod 171 terminating in an abutment forming the stop 57. A spring 173 may be positioned around the piston rod 171 to oppose the movement of the piston 170. The cylinder 168 may be mounted on the stack 23 in any convenient manner in such position that the stop 57 engages the arm 53 to limit the movement thereof. In the operation of this device movement of the piston 170 takes place proportionally to the fluid pressure within cylinder 168. Consequently the valve 125 may be manipulated to build up the required pressure in the cylinder 168, as indicated by the gauge 126, the stack and furnace being observed to note when the proper conditions are obtained. Obviously the piston rod 171 may be connected directly to the control arms 53 if desired and the mechanism 60 omitted, in which case the entire control is obtained by the cylinder 168 or the adjustable stop mechanism may be omitted if such adjustment is not required. The valves 63, 70 and 78 may be of the form illustrated in Fig. 6 which comprises a housing 178 having an inlet port 179 and an outlet port 180 communicating through a port 181 closed by a valve 182 engaging a valve seat 183. The valve 182 is associated with a valve stem 184 which extends through a bushing 185 in the housing 178 and is held in closed position by means of a spring 186 seated between a plate 187 carried by the bushing 185 and a plate 188 engaging a shoulder 189 on the valve stem 184. Suitable adjustment of the spring tension may be effected by turning the bushing 185 which is threaded in the housing 178 for longitudinal movement. The arrangement is such that the valve 182 is normally held in closed position by means of a spring 186. When an excess in pressure occurs the pressure against the face of the valve 182 raises the same from the seat 183 and establishes communication between the inlet port 179 and the outlet port 180.

For manually opening the valve there is provided an arm 192 pivoted as by a shaft 193 to a housing 194 which is supported by the main valve housing 178 and carries a pall 195 which engages a shoulder 196 associated with the valve stem 184. The arm 192 is pivoted to a piston rod 197 which is associated with a piston 198. The piston 198 is seated in a fluid pressure cylinder 199 having an inlet port 200 adapted to be connected to a fluid pressure source through, for example, the line 71. The cylinder 199 is supported on an arm 201 which is carried on the housing 178 of the valve. As applied to the reaction chamber, for example, the inlet port 179 is connected to the interior of the chamber and the outlet port 180 is connected to the pipe 72 leading to the discharge pipe 64. The valve as thus arranged normally remains closed but is opened in response to excess pressure to permit the pressure in the reaction chamber to be relieved by discharge of the vapor to the pipe 72. The valve may also be manually operated from a distance by operating the valve 93 to supply fluid pressure to the line 71 whereupon the piston 198 is moved upwardly, causing pivotal movement of the arm 192 and of the pall 195 which lifts the valve stem 184 and opens the valve 182.

The valve 86 for closing the pipe 36 leading to the hot oil pump 24 may be in the form illustrated in Fig. 5 which comprises a casing 205 having an inlet port 206 and an outlet port 207 and provided with a valve 208 adapted to seat on a valve seat 209. The valve 208 is carried on a valve stem 210 which extends through the casing 205 and engages a lever 211, pivoted on a bracket 212, as at 213. A cylinder 214 may be mounted upon a bracket 215 which may be held by the casing 205 and may support the bracket 212. The lever 211 may be connected to a piston rod 216 which is actuated by a piston 217 seated within the cylinder 214. The line 87 communicates with the cylinder 214 below the piston 217 and is adapted to supply fluid pressure for actuating the piston and, by means of the lever 211, closing the valve 208 against its seat 209.

The valve 86 is normally in open position. To close the same the valve 95 is opened to supply fluid pressure to the cylinder 214 and thereby actuate the piston 217 to cause pivotal movement of the lever 211. The valve then remains closed until manually opened as by grasping the lever 211 or the valve stem 210. With the valve 95 open to the atmosphere, back pressure on the piston is released and the valve may be easily operated in the above manner. Obviously the valve may be opened by spring means if desired, although for safety operation manual opening may be preferred.

The valves 90 to 95 are arranged on the instrument panel 120 as illustrated in Fig. 2 in the sequence of their desired operation in closing down the plant. In a plant of the type shown the sequence of operation of the valves 90 to 95 is in the order of their numbering. The gauges 110 to 115 are arranged directly above the valves with which they are associated to indicate the condition of the control lines. The main gauges 118 and 119 may be mounted at the top of the panel to show the pressure in the header 96 and in the fluid supply line 100. The master control valve 124 may be mounted at a distance as at some safe locality for emergency use.

In the operation of this system, for example in shutting down the plant the valves 90 to 95 may be each rotated through 90° in a clockwise direction in the order named, thereby operating the controls above described for successively admitting a water spray to the blow-down tank, closing the stack damper, emptying the furnace tubes, emptying the reaction chamber, emptying the flash chamber and closing the hot oil pump suction valve. In an emergency, as for example in case of fire, the master control valve 124 may be given a 90° clockwise movement to simultaneously supply fluid pressure to all of the lines and thereby simultaneously to effect all of the above operations. The master control may be omitted, if desired, in which case the valves 90 to 95 will vent directly into the atmosphere.

It is to be noted that in normal operation the various fluid pressure lines are vented through the ports 135 of the different valves 90 to 95 through the line 123 and through the corresponding port 135 of the valve 124 thereby preventing any pressure from being built up in the fluid controlled valves which might tend to cause accidental operation thereof. The gauges 110 to 115 indicate whether the lines are clear and functioning properly.

The valve 125 may be utilized to effect the necessary adjustment of the stack damper after the plant has been closed down. This is particularly effective in case of a leak in the furnace tubes as it permits the gases to be removed from the furnace and at the same time provides a check on the fire.

A feature of this safety system above described resides in the simplicity of its operation and the fact that it may be operated by an unskilled attendant. The control panel 120 is intended to be located in the readily accessible position, as in the control room where it may be operated by the attendant with a minimum of delay. The various check valves prevent the fluid pressure from being lost in the storage tank 98 in case of failure of any of the lines. The tank has sufficient capacity to actuate all of the control apparatus, but the hand pump 103 may be utilized as an additional safety device for building up the desired pressure for operating the control mechanism in case of failure of the fluid pressure in the tank 98.

As a further feature of the invention it is to be noted that the reaction chamber 11 and the flash chamber 12 may be drained by manipulation of the manual valves 74 and 84.

While certain types of control valves have been illustrated, it is obvious that the system may be operated with any suitable type of valve capable of accomplishing the above function. It is also evident that the safety system may be applied to other plants having other pieces of apparatus and that the control valves may be arranged in the desired sequence for accomplishing the purposes specified regardless of the specific apparatus involved. It is further to be noted that the use of small tubing such as that required for the fluid pressure lines permits the control valves and gauges to be located in any convenient position without unduly increasing the cost and difficulty of installation. The system also permits the valves to be effectively operated regardless of their location in the plant or their distance from the control panel.

Although a specific embodiment of the invention has been illustrated, it is obvious that various changes and modifications may be made therein by a person skilled in the art. The invention is accordingly to be limited only in accordance with the following claims when interpreted in view of the prior art.

What is claimed is:

1. In an oil refining plant, a plurality of control valves adapted to be operated in a preferred sequence for shutting down the plant, fluid pressure means including lines to actuate each of said control valves, a source of fluid pressure and a fluid pressure vent line, a valve for each of said fluid pressure lines adapted to alternately connect the same to said source or to said vent line, and a master valve in said vent line, said master valve having a vent and having means to connect said vent line to said vent or to said source to actuate all of said controls in unison.

2. In an oil refining plant, a plurality of control valves adapted to be operated in a preferred sequence for shutting down the plant, fluid pressure means including lines to actuate each of said control valves, a source of fluid pressure and a fluid pressure vent line, a valve for each of said fluid pressure lines adapted to alternately connect the same to said source or to said vent line, and a master valve in said vent line, said master valve having a vent and having means to connect said vent line to said vent or to said source to actuate all of said controls in unison, an instrument panel containing all of said last-mentioned valves, said valves being arranged on said panel in physical order corresponding to said given sequence so that the plant may be shut down by progressively actuating said valves in the order of their arrangement on the instrument panel.

3. In an oil cracking plant having a tube furnace, stack with damper, reaction chamber and flash chamber, in combination, a plurality of control means adapted respectively to close the stack damper, to empty the furnace tubes, to discharge the reaction chamber, to discharge the flash chamber, and to interrupt the oil supply to the furnace tubes, the fluid pressure means including lines to actuate each of said control means, a source of fluid pressure and a fluid pressure vent line, a valve for each of said fluid pressure means adapted to alternately connect the same to said source or to said vent line, and a master valve in said vent line, said master valve having a vent and having means to connect said vent line to said vent or to said source to actuate all of said controls in unison.

RALPH M. PARSONS.